(12) United States Patent
Vaidya et al.

(10) Patent No.: US 9,253,027 B2
(45) Date of Patent: *Feb. 2, 2016

(54) GRACEFUL HANDLING OF CRITICAL TRAFFIC BLACKHOLING FAULTS

(71) Applicant: Cisco Technology, Inc., San Jose, CA (US)

(72) Inventors: Nikunj R. Vaidya, Milpitas, CA (US); Pradosh Mohapatra, Fremont, CA (US); Arun Satyanarayana, Fremont, CA (US); Pankaj Bhagra, Fremont, CA (US); Clarence Filsfils, Brussels (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/148,494

(22) Filed: Jan. 6, 2014

(65) Prior Publication Data

US 2014/0192630 A1 Jul. 10, 2014

Related U.S. Application Data

(63) Continuation of application No. 12/883,895, filed on Sep. 16, 2010, now Pat. No. 8,627,137.

(51) Int. Cl.
*G06F 11/00* (2006.01)
*H04L 12/24* (2006.01)
(Continued)

(52) U.S. Cl.
CPC ............ *H04L 41/0672* (2013.01); *H04L 41/04* (2013.01); *H04L 41/0659* (2013.01); *H04L 41/0677* (2013.01); *H04L 45/02* (2013.01); *H04L 45/28* (2013.01); *H04L 43/0811* (2013.01); *H04L 43/0817* (2013.01)

(58) Field of Classification Search
USPC ................. 709/203, 230, 238; 714/4.2, 4.11; 370/218, 222, 236.2, 400
See application file for complete search history.

(56) References Cited

U.S. PATENT DOCUMENTS 7,178,052 B2 2/2007 Hebbar et al.
7,706,281 B2 4/2010 Dalal et al.
(Continued)

OTHER PUBLICATIONS

Wang, "Explicit Routing Algorithms for Internet Traffic Engineering", 1999, IEEE, p. 582-588.*
(Continued)

*Primary Examiner* — Bryce Bonzo
*Assistant Examiner* — Jeison C Arcos
(74) *Attorney, Agent, or Firm* — Novak Druce Connolly Bove + Quigg LLP

(57) ABSTRACT

In one embodiment, a network device may detect a data plane critical fault condition, while a corresponding control plane is not experiencing a critical fault condition. In response to a network device based critical fault condition, the network device may activate and advertise an increased and expensive usable metric for each network interface of the network device. On the other hand, in response to an interface based critical fault condition, the network device may activate and advertise an increased and expensive usable metric for one or more particular network interfaces of the interface based critical fault, and signals, over the control plane to a corresponding network device at an opposing end of each particular network interface of the interface based critical fault, a request to activate and advertise an increased and expensive usable metric at the opposing end of each particular network interface.

19 Claims, 9 Drawing Sheets

(51) Int. Cl.
*H04L 12/751* (2013.01)
*H04L 12/703* (2013.01)
*H04L 12/26* (2006.01)

(56) References Cited

U.S. PATENT DOCUMENTS

| | | | |
|---|---|---|---|
| 7,710,882 | B1 | 5/2010 | Previdi et al. |
| 7,715,307 | B2 | 5/2010 | Walton et al. |
| 7,738,495 | B2 | 6/2010 | Dalal et al. |
| 7,751,336 | B2 | 7/2010 | Hopps et al. |
| 7,769,886 | B2 | 8/2010 | Naseh et al. |
| 7,773,611 | B2 | 8/2010 | Booth, III et al. |
| 2003/0119555 | A1 | 6/2003 | Friesen et al. |
| 2005/0007951 | A1 | 1/2005 | Lupuh et al. |
| 2006/0056303 | A1 | 3/2006 | Aggarwal et al. |
| 2006/0056411 | A1* | 3/2006 | Badat et al. ............ 370/392 |
| 2006/0126495 | A1 | 6/2006 | Guichard et al. |
| 2006/0256712 | A1 | 11/2006 | Imajuku et al. |
| 2006/0268682 | A1* | 11/2006 | Vasseur ............ 370/216 |
| 2007/0104197 | A1 | 5/2007 | King |
| 2007/0162565 | A1 | 7/2007 | Hanselmann |
| 2007/0211623 | A1 | 9/2007 | Nishioka |
| 2008/0037526 | A1 | 2/2008 | Dong |
| 2008/0049621 | A1 | 2/2008 | McGuire et al. |
| 2008/0247324 | A1* | 10/2008 | Nadeau et al. ............ 370/245 |
| 2009/0196181 | A1 | 8/2009 | Retana et al. |
| 2009/0201803 | A1 | 8/2009 | Filsfils et al. |
| 2010/0103846 | A1 | 4/2010 | Chiabaut et al. |

OTHER PUBLICATIONS

Retana, "OSPF Stub Router Advertisement", Jun. 2001, Network Working Group, p. 1-5.*
Moy, J., "OSPF Version 2," RFC 2328, Apr. 1998, pp. 1-245.
Li, T., et al., "IS-IS Extensions for Traffic Engineering," RFC 5305, Oct. 2008, pp. 1-18.

* cited by examiner

GRACEFUL HANDLING OF CRITICAL TRAFFIC BLACKHOLING FAULTS

CROSS-REFERENCES TO RELATED APPLICATIONS

This application is a continuation of U.S. patent application Ser. No. 12/883,895, filed Sep. 16, 2010, and entitled GRACEFUL HANDLING OF CRITICAL TRAFFIC BLACKHOLING FAULTS, the content of which is hereby incorporated by reference in its entirety.

TECHNICAL FIELD

The present disclosure relates generally to computer networks, and, more particularly, to critical fault handling for traffic blackholing faults on routers.

BACKGROUND

When a critical fault impacts both the data plane and control plane of a network device, routing protocols generally detect the faults and successfully divert away the traffic if there is sufficient redundancy. However, when only the data plane fails, leaving the control plane functional, traffic may be "blackholed," such that the control plane assumes that the connection is functioning, but the data plane is physically unable to forward the traffic.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
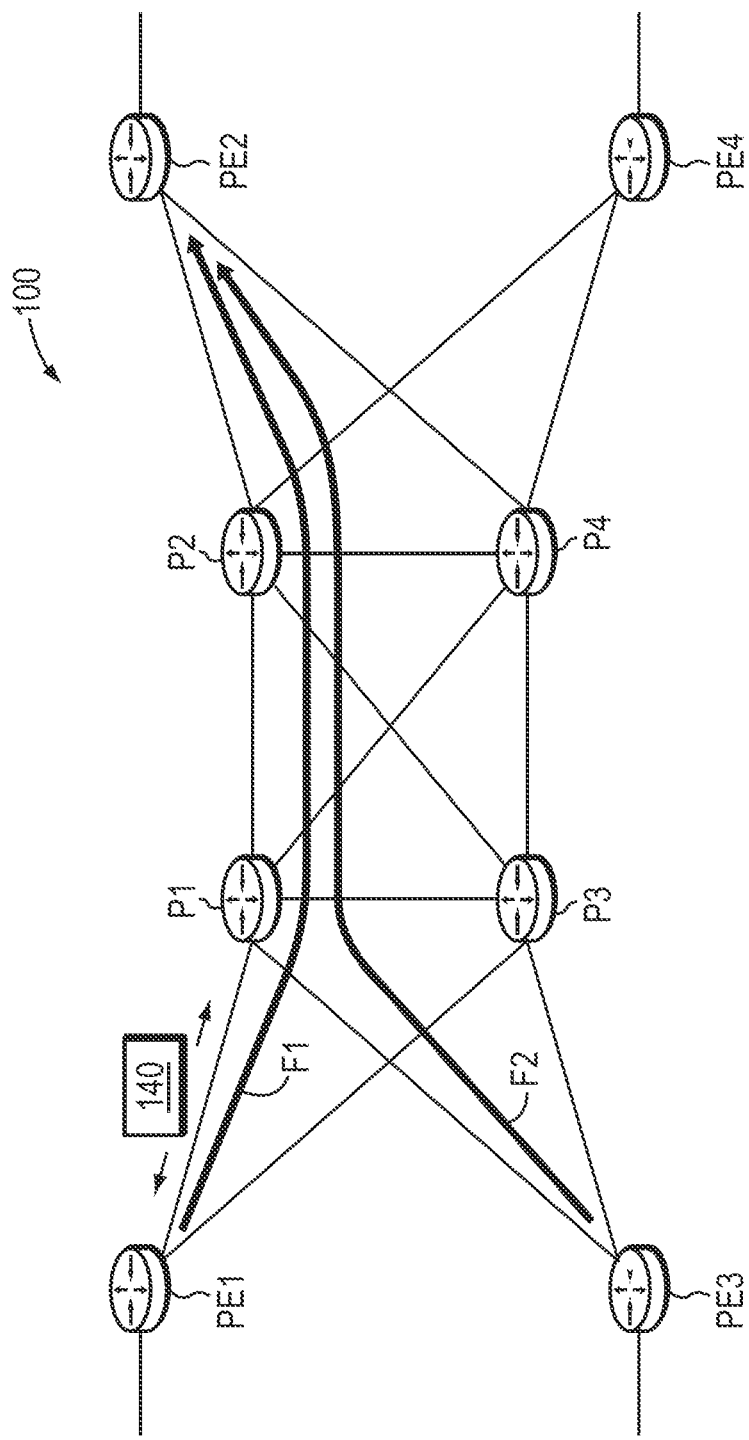
FIG. 1 illustrates an example computer network.

According to one or more embodiments of the disclosure, a network device having one or more network interfaces may detect a data plane critical fault condition, while a corresponding control plane is not experiencing a fault condition. Depending upon whether the detected critical fault condition is interface based or network device based, the network device may respond to the critical fault condition, e.g., to prevent blackholing of traffic. In response to a network device based critical fault condition, the network device may activate and advertise an increased and expensive usable metric for each network interface of the network device. On the other hand, in response to an interface based critical fault condition, the network device may activate and advertise an increased and expensive usable metric for one or more particular network interfaces of the interface based critical fault, and signals, over the control plane to a corresponding network device at an opposing end of each particular network interface of the interface based critical fault, a request to activate and advertise an increased and expensive usable metric at the opposing end of each particular network interface. In this manner, critical traffic blackholing critical faults may be handled that may otherwise go undetected by a functioning control plane. Also, in one or more embodiments, gracefully diverting the traffic away from the affected interface employs a technique that prevents any occurrence of microloops.

Description

A computer network is a geographically distributed collection of nodes interconnected by communication links and segments for transporting data between end nodes, such as personal computers and workstations. Many types of networks are available, with the types ranging from local area networks (LAN s) to wide area networks (WANs). LANs typically connect the nodes over dedicated private communications links located in the same general physical location, such as a building or campus. WAN s, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 1 is a schematic block diagram of an example computer network 100, e.g., a service provider "core" network, illustratively comprising nodes/devices interconnected by links as shown. For example, the illustrative network 100 may comprise one or more provider edge (PE) devices PE1-4 located at the periphery of the network, e.g., to interconnect with various customer edge (CE) devices of customer networks. The PE devices may in turn be interconnected via one or more intermediate (core) nodes or provider (P) devices P1-4 within the core of the network, as may be appreciated by those skilled in the art. Those skilled in the art will understand that any number of nodes, devices, links, etc. may be used in the computer network, and that the view shown herein is for simplicity. Those skilled in the art will also understand that while the embodiments described herein is described generally with relation to a provider network, it may apply to any network configuration within an Autonomous System (AS) or area, or throughout multiple ASes or areas, etc., particularly those arranged with a degree of redundancy within the network, as may be appreciated by those skilled in the art.

Data packets 140 (e.g., traffic, messages, etc.) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, various tunneling protocols, etc., as noted herein. As shown, illustrative traffic flows F1 and F2 may traverse a particular device, P1, based on various routing protocols or other decisive mechanisms.

Figure 2A:
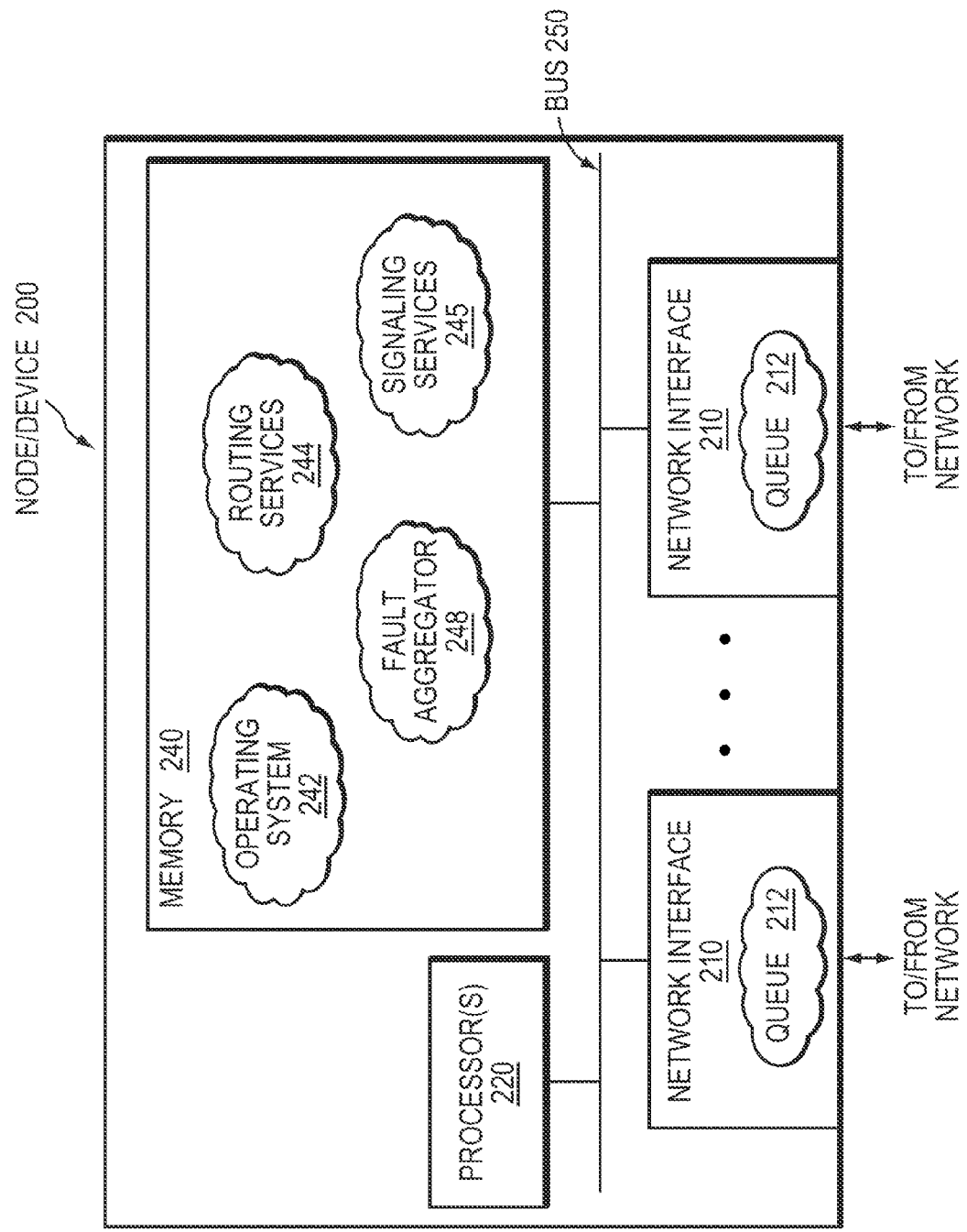
FIGS. 2A-B illustrate an example network device/node.

FIG. 2A is a schematic block diagram of an example node/device 200 that may be used with one or more embodiments described herein, e.g., as a router or other network device. The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art. Further, network interfaces 210 may be configured transmit and/or receive traffic (e.g., packets) using one or more queues 212, which may be specific to each network interface as shown, or may be generally controlled by the device 200.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing process/services 244, an illustrative signaling process 245, and a fault aggregator 248, each as described herein. It will be apparent to those skilled in the art that other types of processors and memory, including various computer-readable media, may be used to store and execute program instructions pertaining to the techniques described herein. It is also noted herein that any of the processes may alternatively be embodied as modules, composed of software, hardware, firmware, or any combination thereof.

Routing services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 244 may also perform functions related to virtual routing protocols, such as maintaining virtual routing and forwarding (VRF) instances, or tunneling protocols, such as for Multi-Protocol Label Switching (MPLS), etc., each as will be understood by those skilled in the art.

Figure 2B:
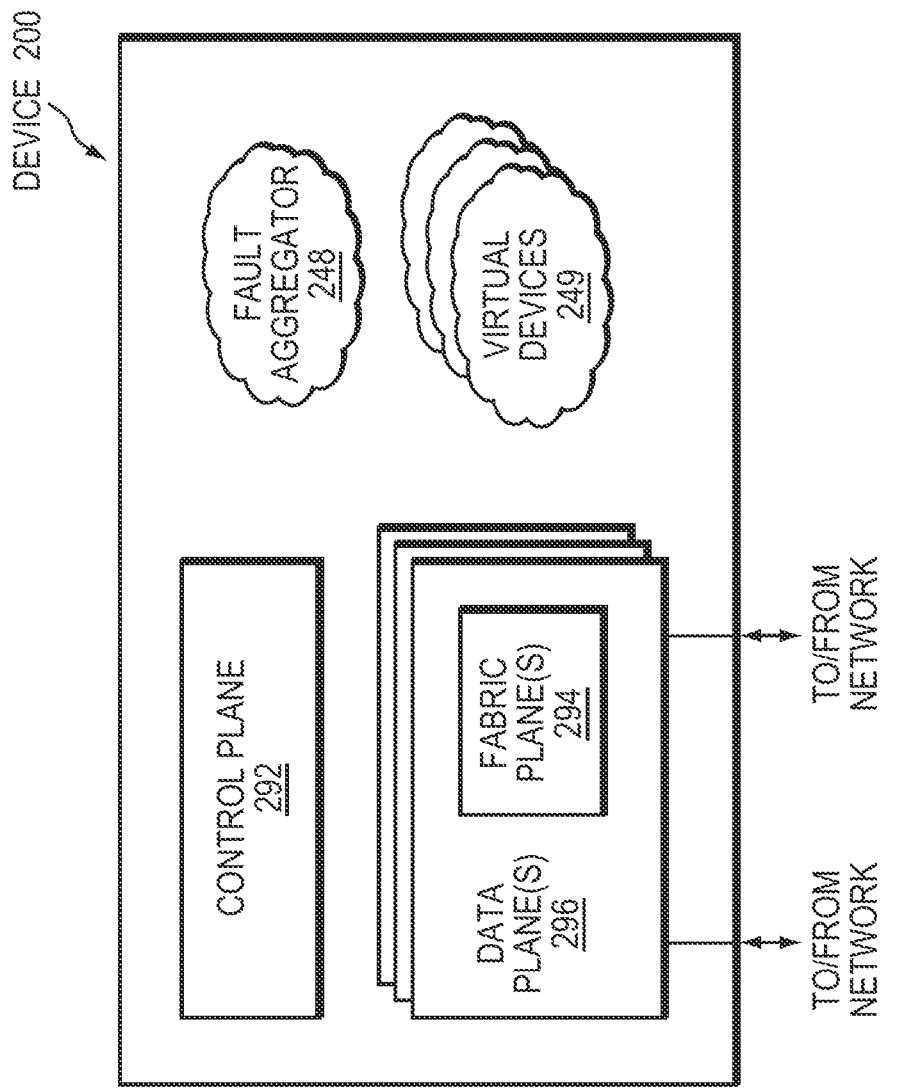

FIG. 2B illustrates an alternative view of network device 200. For instance, a network device 200 may comprise various components arranged logically as a plurality of "planes" or partitions, where each plane is responsible for various actions. For example, a typical network device may comprise a control plane 292, which controls the general activity of the device, interconnected generally to a data plane (or forwarding plane) 296, generally comprising network interfaces, circuitry, queues, etc. for physically forwarding traffic. One or more fabric planes 294 are a part of the data plane (e.g., and control plane), and may provide various services, as may be appreciated by those skilled in the art. Note also, that the fault aggregator 248 is shown as a component of the alternative view, and that various virtual devices 249 (e.g., virtual routers configured with virtual control planes, forwarding planes, and/or data planes) may also be present on the network device as may further be understood by those skilled in the art.

As noted above, when a critical fault impacts both the data plane and control plane of a network device, routing protocols generally detect the faults and successfully divert away the traffic if there is sufficient redundancy. For instance, routing protocols (e.g., process 244) may detect most Layer-1 physical faults, such as broken links, completely hardware failures, etc., through various measures, such as missing "hello" messages or other notifications. As such, the routing protocols act accordingly, and reconverge to divert the traffic. However, when only the data plane fails, leaving the control plane functional, traffic may be "blackholed," such that the control plane assumes that the connection is functioning, but the data plane is physically unable to direct the traffic. For example, queuing circuits in the data-path may run out of resources (an "OOR" out of resources condition) where low priority buffers are exhausted (e.g., due to memory-leak or sustained oversubscription, etc.), but the high priority buffers are not exhausted (due to light traffic or protected). Often, control plane traffic, such as routing protocol exchanges, is sent over high priority buffers (queues 212), and thus routing protocols may not be able to easily detect a data plane problem on the low priority buffers/queues 212.

According to embodiments of the disclosure, therefore, a mechanism is described herein where a network device (e.g., router) can selectively remove itself or its interfaces/links (in case only a subset of links are affected) from the network, e.g., without incurring any significant microloops, upon detecting a failure undetectable by existing mechanisms such as control plane packets (or planned critical faults, such as service upgrades). For instance, the embodiments herein specifically target the faults that may cause blackholing scenarios when control plane and data plane operation are out of sync. That is, during the traffic-blackholing fault occurrence, the control plane is generally in a healthy state while only the data-plane is impacted, since, as noted above, if the control plane is also impacted, the traffic should automatically get diverted by routing protocols. As used herein, therefore, the control plane may still be used as a communication transport to network peers to signal diversion of traffic as described in detail below.

Illustratively, the techniques described herein may be performed by hardware, software, and/or firmware, such as in accordance with fault aggregator process/entity 248 (e.g., a platform manager), which may contain computer executable instructions executed by the processor 220 to perform functions relating to the novel techniques described herein, e.g., in conjunction with routing process 244 operating in a generally conventional manner, such that the fault aggregator may notify the routing protocols of process 244 to take specific action to reroute the traffic as described herein. Also, signaling process 245 may also contain computer executable instructions executed by the processor 220 to perform functions relating to the novel techniques described herein, such as illustratively being embodied as a bidirectional forwarding and detection (BFD) process, or sub-process of routing process 244 (e.g., IGP signaling), etc.

Operationally, the network device is configured to first detect a data plane critical fault condition, which may occur when a corresponding control plane is not experiencing a critical fault condition. For instance, as noted previously, when a router encounters a critical (e.g., layer 1) fault in the data-path, routing protocols lose their periodic hellos and thus reroute the traffic to another redundant link in the network. However, there are certain critical data plane faults that may not cause protocol hellos to be dropped, but potentially can drop data packets. Such faults introduce compromised traffic impacts, such as traffic-blackholing or other performance (e.g., throughput) degradation. For example, low-priority buffers in an ASIC may be leaked out (not available) whereas high-priority queues are still available due to special buffer-reservation built into ASICs, thus causing the routing protocol hellos to be transmitted to continue advertising to the device's peers that this device is still the best route to forward traffic.

Example critical data plane fault conditions, therefore, may comprise, among other things: multiple fabric planes being down; out of resources (OOR) conditions (e.g., memory, processing, buffers/queues, etc.); specifically out of buffer (OOB) conditions (e.g., surpassing queue utilization thresholds). In addition, various manual selections may cause a detectable critical fault condition, such as in-service software upgrades (ISSUs) or faults, which are usually done on a live router. Note that in this case, should an ISSU itself not trigger a critical fault, a resultant critical fault or unsuccessful upgrade during the ISSU may result in a detected critical fault, accordingly. Other example critical data plane faults may also be detected, such as a number of usable links within a link bundle remaining alive, or losing a substantial portion of a backplane fabric, e.g., due to hardware issues, parity errors, etc., which may constrain/reduce the backplane bandwidth while allowing enough bandwidth for the control plane to keep adjacencies alive, thus causing congestion and/or blackholing effect. Other, possibly platform specific faults may also be configured for detection by fault aggregator 248, such as multicast planes/processing being down; losing a standby/redundant route processor; and process placement faults (e.g., where a rack online insertion and removal or "OIR" did not successfully move the processes to other racks).

Notably, certain critical data plane faults, such as those described above, may be associated with configurable thresholds upon which a critical fault condition is detected. For instance, customers can configure an availability threshold of a certain number of fabric planes 1 cards going down that would trigger a fault (or a minimum number remaining), or a certain percentage of available resources (e.g., queue depth/overrun), etc.

Once the fault aggregator 248 detects one of these critical fault conditions, generally indicative of potential problems such as blackholing, it may then be determined whether the detected critical fault condition is interface based (i.e., for one or more particular interfaces 210 of the network device) or network device based (i.e., a device wide fault, such as shared resources). This determination may be made based on the type of fault, such as certain faults pertaining to interfaces specifically (e.g., queue-based) and other faults pertaining to the entire device (e.g., fabric planes). Notably, according to one or more aspects herein, faults that overlap in occurrence may be considered, such as when one fault is in process (e.g., in a "delay" state, being recovered) and another fault occurs. Generally, when two faults have occurred, the following scenarios and actions may result:

(1) When there is currently an interface-specific fault state and a router-wide fault occurs, the router-wide fault is activated;
(2) If the current fault is a router-wide fault and an interface-specific fault occurs, then the interface-specific fault is held until the router-wide fault is deactivated, and then the interface-specific fault is activated (if still in effect);
(3) If the current fault is a router-wide fault and another router-wide fault occurs, any fault-based timers may be reset, and the new fault is activated (note that no action may be needed, as the action may already be effect);
(4) If the current fault is an interface-specific fault and a new fault for a new interface occurs, this new fault may be activated.

(Note that a dampening mechanism may be introduced to account for a same fault occurring repeatedly.)

If the detected fault is network device based (e.g., "router-wide"), then the goal is to divert traffic away from the network device entirely. This may be achieved by activating and advertising, e.g., via IGP, an increased and expensive usable metric for each network interface of the network device. Specifically, the metric is increased, meaning larger (more costly/expensive) than a current metric used for each respective interface, and is expensive, meaning that compared to average cost links/interfaces of the network 100, the interfaces should generally be avoided given alternative (e.g., redundant) options. In one embodiment, IGP advertisements (of routing process 244) may be used to distribute the metric(s). When OSPF is used, a global maximum metric may be used, illustratively including stubs. On the other hand, when IS-IS is used, a maximum metric value less two may be used. Specifically, either the OSPF or IS-IS maximum metrics are the maximum usable metric. In particular, since in IS-IS, the actual maximum value is reserved, and the maximum less one deems a link (network interface) as unreachable, the applicable usable metric in this case is the maximum value less two. This approach for using IS-IS metrics maximum value less two helps to forward traffic if there is no network level redundancy for that routing device. This also simulates the behavior exhibited by OSPF when max-metric is enabled/advertised. Note also that for IS-IS, the metric value may change depending upon the metric style used (e.g., normal or wide). Additionally, when IGP is synchronized with a label distribution protocol (LDP), i.e., if "LDP-IGP sync" is active, then bringing down an LDP session associated with a faulty interface (link) would be sufficient to divert away the transit traffic from utilizing that link.

Figure 3A:
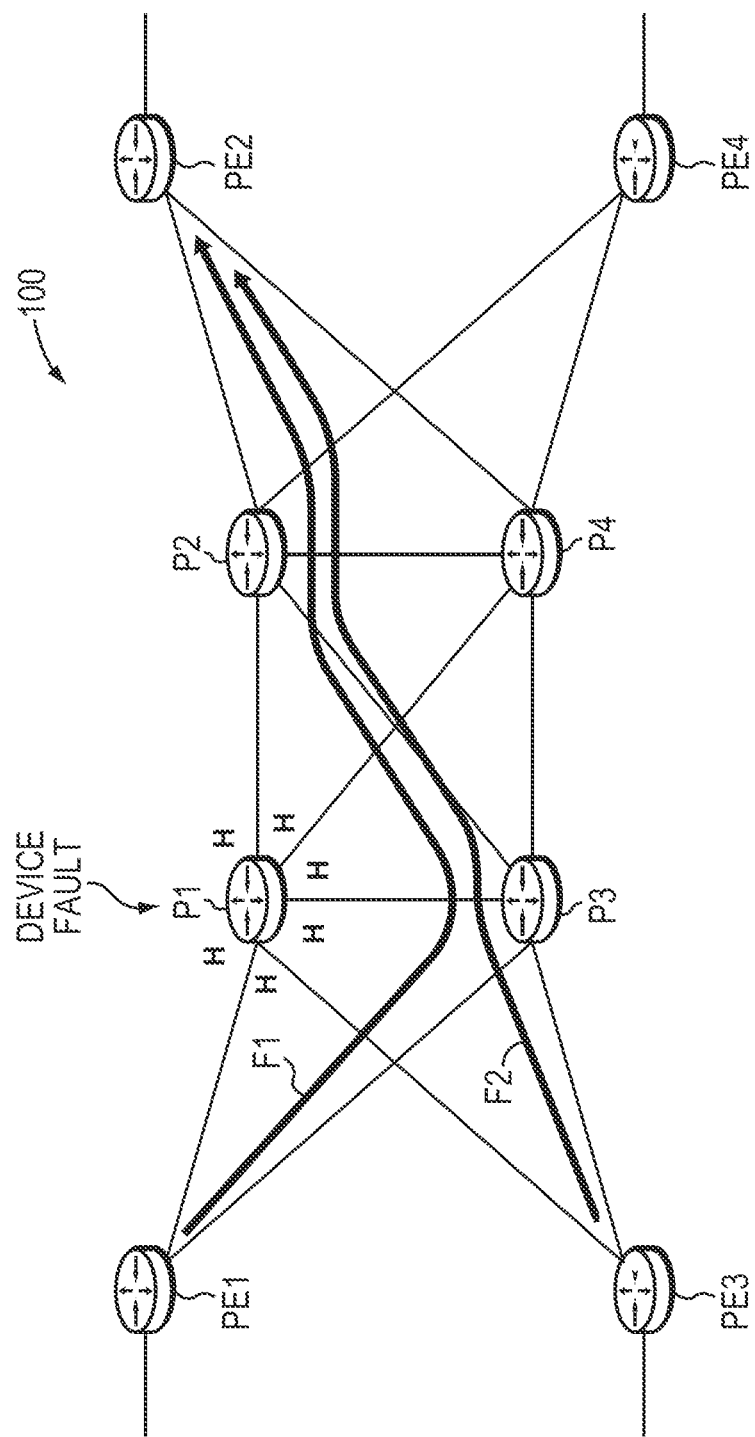
FIGS. 3A-B illustrate an example computer network with a network device based critical traffic blackhole data plane fault.

FIG. 3A illustrates the example computer network of FIG. 1, showing a response to a network device based (router-wide) critical data plane fault. In particular, assuming that the device P1 has detected a device based fault, then it activates and advertises a "high" cost on all of its interfaces (indicated by the letter "H"). Accordingly, the previous flows F1 and F2 traversing P1 may be redirected around P1 as shown once routing protocols have reacted (e.g., gracefully) to the critical data-plane fault of P1 (understood by the peer devices in the network at least by expensive use of the interfaces).

Figure 3B:
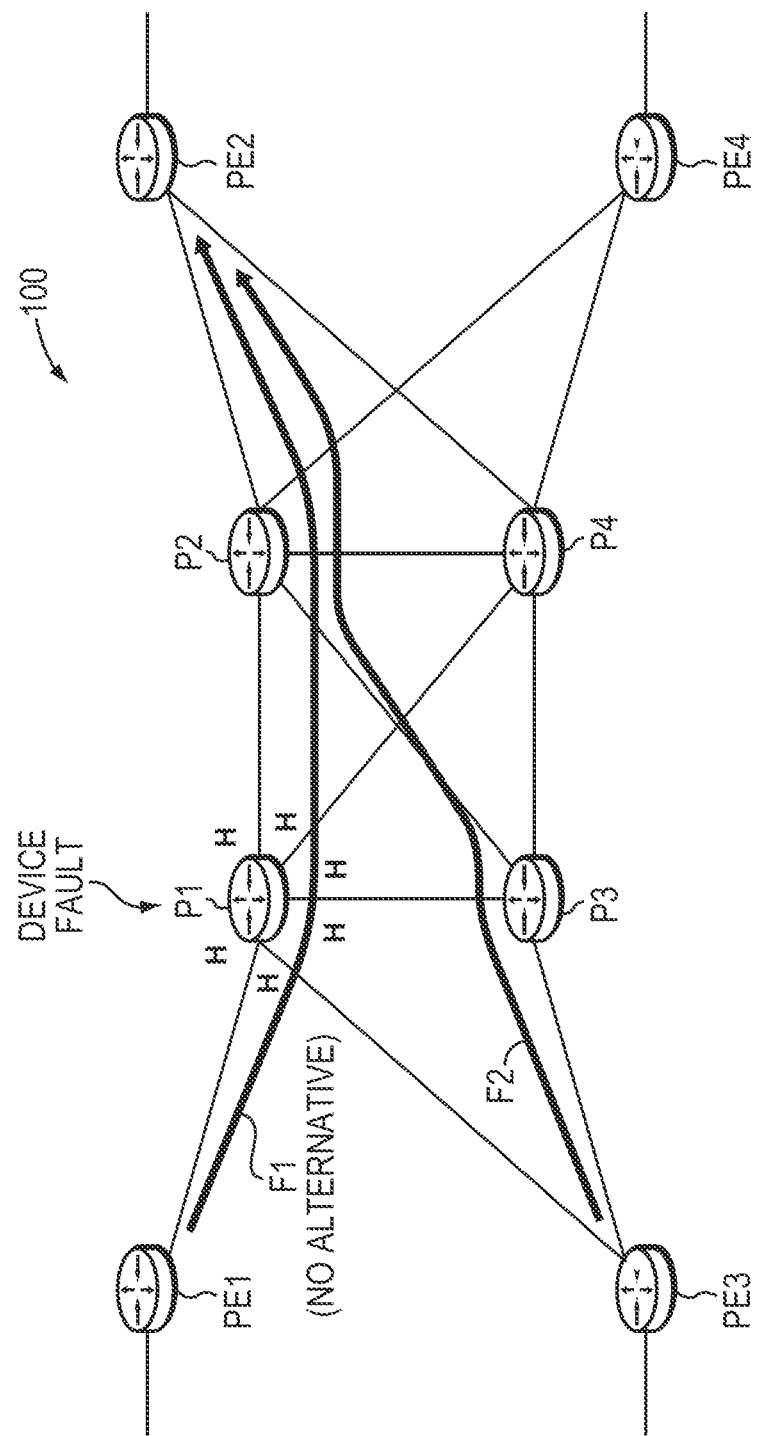

By using the increased, expensive (yet usable) metrics (e.g., the maximum), an important caveat is granted to the embodiments herein. In particular, if there is not actually any redundancy in the network to route around the faulted links, such as at various edge devices of certain networks, then the expensive (faulted) links may still be used as a last resort. That is, if even only a relatively small amount of traffic (e.g., 10%) makes it through the potentially blackholing device/interface, that may be considered as better than none of the traffic. FIG. 3B illustrates this point, having removed a redundant link between PE1 and P3, thus forcing the flow F1 to traverse the faulted device P1 (e.g., with potentially degraded performance). For this reason, also, the "overload" bit of IS-IS is not used, since all traffic toward the faulty link without a redundant path will be completely dropped, rather than at least attempting a degraded performance route as shown in FIG. 3B. (Note also that it may be possible to use an "R-bit" in OSPF3, to prevent the router from being used for 1Pv6 transit traffic.)

If, on the other hand, the critical data plane fault is specific to an interface or set of interfaces, the goal is to divert the traffic away from that particular interface/link or set (e.g., links on a shared line card). In response to an interface based critical fault condition, then, the increased and expensive usable metric as described above may be activated for the one or more particular ("affected") network interfaces of the fault, and advertised into the network. In addition, the network device may signal a request (over the control plane) to a corresponding network device to activate and advertise an increased and expensive usable metric at the opposing end of each opposing end of each particular faulted network interface. That is, through this signaling exchange, the increased and expensive (e.g., maximum) metric will be activated on both ends of the link and thus transit traffic through the interface is diverted away from that link, if possible.

Figure 4A:
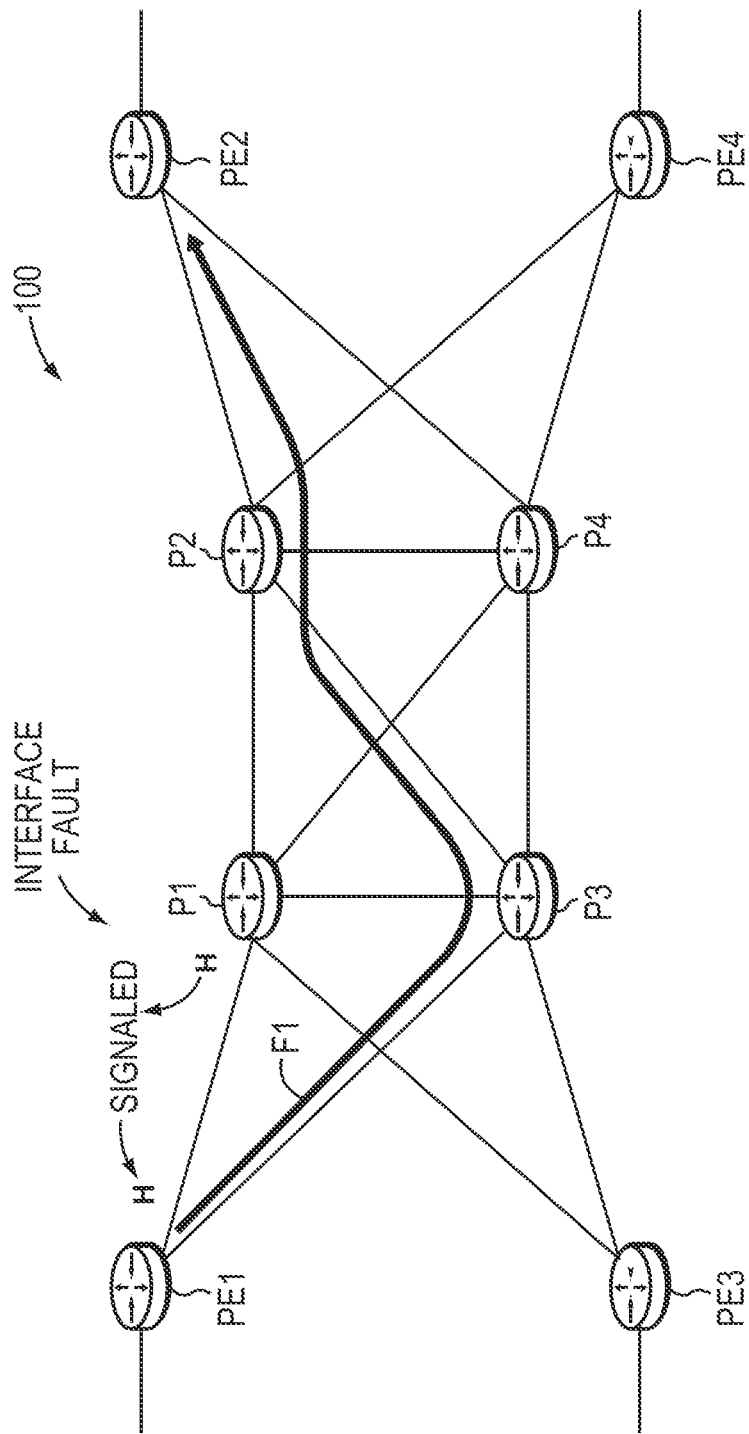
FIGS. 4A-B illustrate an example computer network with an interface based critical traffic blackhole data plane fault.
Figure 4B:
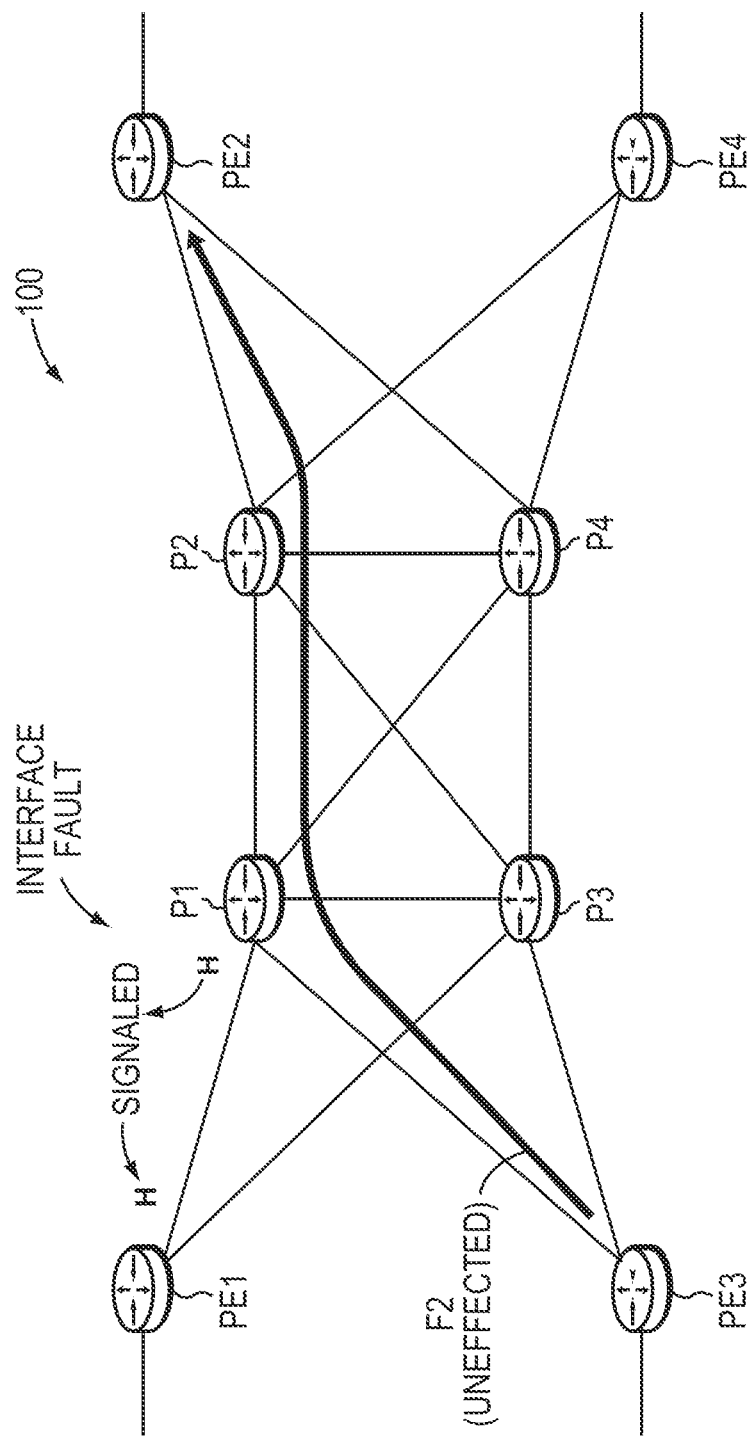

FIGS. 4A and 4B illustrate an example traffic redirection in response to a single interface fault, such as between P1 (the detecting/faulty device) and PE1, which is interconnected to P1 via the faulty interface. Pl, for example, may detect the critical fault condition on the particular interface to PE1, activates the expensive metric (shown again as "H"), and informs PE1 to do the same. PE1 receives the request, and may act accordingly. As shown, then, flows Fl (FIG. 4A) and F2 (FIG. 4B) may be redirected away from that faulty interface due to the high cost of the link, though unlike a network device based fault as described above, not necessarily away from the device (P1), as shown in FIG. 4B. Note that for a network device based fault, the signaling is not required as the entire device is expensive to traverse. In the event of an interface based fault, however, without increasing the cost at both ends of the link, devices may still use the faulty interface as an ingress to reach the comparatively low cost egress interfaces of the network device. In other words, the signaling is beneficial because the new metric can be activated on only one end of the link by IGP, which could divert the egress traffic on that "affected" interface, but it would not divert the traffic that is in the ingress direction on the interface.

The above signaling may be performed by signaling process 245, such as extensions to bidirectional forwarding detection (BFD) messages and/or IGP messages. In one embodiments, an extension in IGP signals BFD to advertise the new increased and expensive metric to its peer on that interface (e.g., P1 signaling to PE1), and BFD may be extended to receive this notification from IGP (e.g., at P1), and to propagate a received BFD message from a peer (e.g., by PE1) into IGP, which in turn activates the new metric on the other end of the affected link. BFD may be used in this embodiment for its particular ability to provide acknowledgments (acks). In an alternative embodiment, IGP based signaling may also be used. For instance, IGPs such as IS-IS may have a 3-way handshake mechanism which may be utilized to achieve the signaling, thus avoiding the need for BFD operations. Notably, in either embodiment, since the control plane is still functioning while the data plane is broken, the control plane may be used as a transport to signal the other (peer) end to adjust the metric.

In accordance with one or more embodiments herein, techniques for minimizing the occurrence of "microloops" (or "micro-loops") are also provided. In particular, an even more graceful "costing out" of the affected links may be provided that reduces microloop occurrence. For example, assuming the topology shown in FIG. 1, if a blackhole fault occurs on P2's linecard that impacts the link P2-P1, P2 would need to take an action to initiate costing-out the link P2-P1 in both directions, hence on both the ends. Microloops may occur in this case when the new metric has not completely propagated to all neighboring nodes. For instance, assuming all the links have a metric of one (1) initially, and that there are no "diagonal" connections (P1-P4 or P2-P3), P1 may advertise the directed link P1->P2 with a metric of max-2, which may then cause a transient state: P1 routes to P2 via P3 (P1 knows that the directed link P1=>P2 is max-2) while P3 has not yet received the new metric of the directed link P1=>P2, and hence P3 routes to P2 via P1.

To avoid microloops, therefore, one or more embodiments herein may incrementally activate (and advertise) increased metrics until reaching a final expensive usable metric, such that the change from one particularly chosen metric to a next one (along with an appropriate delay) does not cause any microloops in the network. An algorithm that may be used to determine specifically chosen increments may consist in finding all the children devices that depend on the directed link that needs to be modified, and then finding a set of metrics such that at each step (increment), one level of child dependency is impacted (e.g., the grandchildren, then the children, and so on). An illustrative example algorithm that may be used is described in "A voiding transient loops during the convergence of link-state routing protocols," by Pierre Francois and Olivier Bonaventure, IEEE/ACM Transactions on Networking, 15(6):1280-1932, December 2007.

As an example implementation, in the above topology, the algorithm would allow P1 to realize that it should first set the metric to 2 and propagate it. Indeed, with metric 2, P1 does not change its route to P2, while P3 will change its route. At this time, P1 can set the corresponding P1-P2 metric to max-2. Accordingly, the detecting network device may signal to its peers to initiate the incremental increases, and may also perform the increases incrementally as well. Once the ultimate metric (e.g., maximum, max-2, or other expensive chosen metric), acknowledgments may be communicated between the peer devices, e.g., in order to indicate when the faulty interface may enter a maintenance status (or out-of-service, "OOS" status).

Notably, a fault is identified, it may be beneficial to dynamically initiate a recovery mechanism (e.g., auto-recovery or node reload) once the routing protocols have gracefully rerouted the traffic. That is, the embodiments herein may request that traffic be rerouted from problematic interfaces/ devices, the detecting network device may itself attempt to recover from the fault state to be eligible to route the traffic once more.

While the above description addresses certain core functionalities of one or more embodiments here, other considerations may also be made. For example, to provide the customer with better control over the functionalities various knobs may be provided to allow a "sticky expensive metric," in which case, the new metric persists even after the fault goes away and would need to receive a manual fault clearing/removal by an operator. Alternatively, a "non-sticky expensive metric" may be set to stop expensive metric advertisement after a sufficient wait-time (configurable), once the fault disappears. In other words, in response to determining that the critical fault condition has cleared, the corresponding activated increased and expensive usable metrics may be removed, in response to either expiration of a timer or a manual response. Note also that when a fault is cleared, messages/signals may be exchanged to remove the new metric from peer ends of the interfaces, if so necessary (interface based faults).

Figure 5:
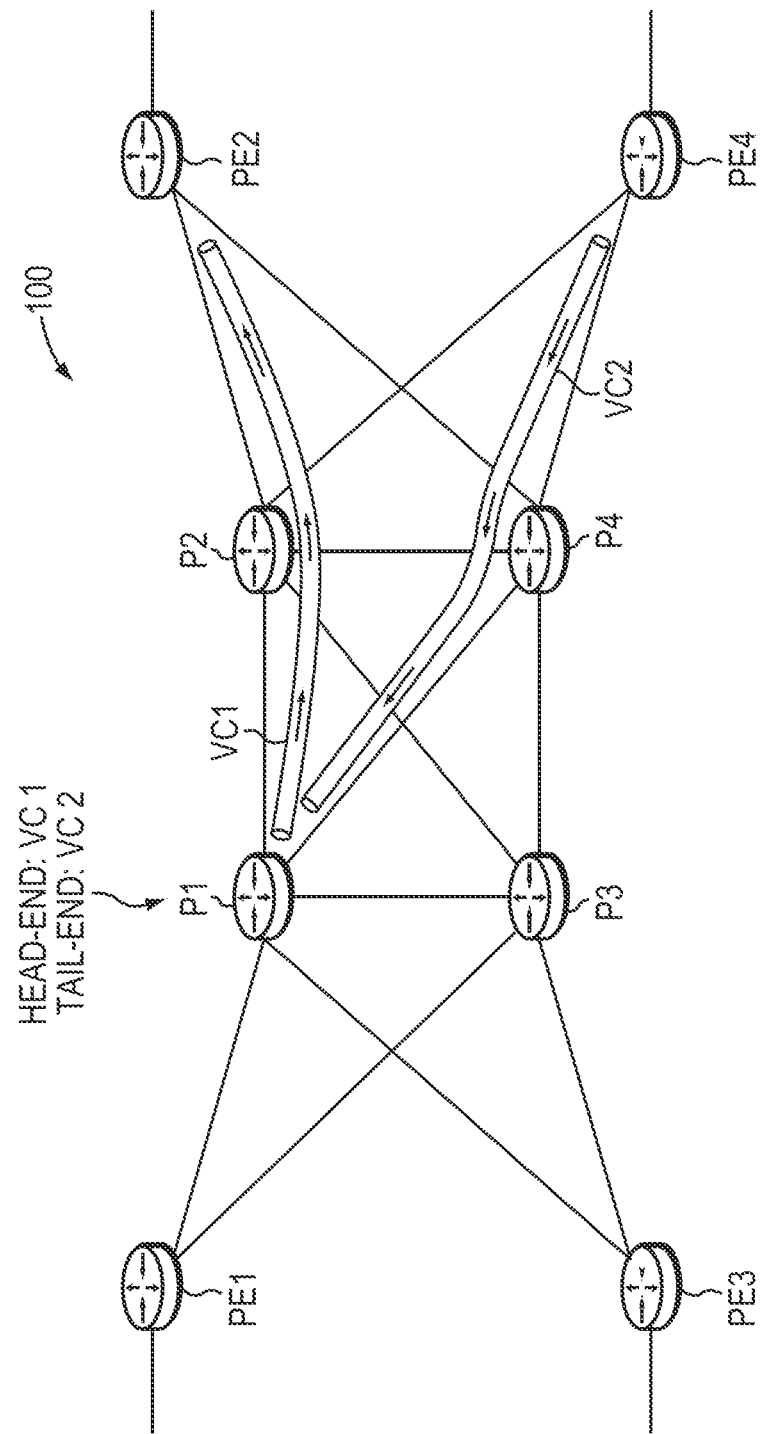
FIG. 5 illustrates an example computer network with Traffic Engineering tunnels.

Further, the embodiments herein may be used in operation with the Traffic Engineering (TE) implementations (e.g., tunnels or other virtual circuits), as shown in FIG. 5, where P1 is a head-end node for virtual circuit VC1, and a tail-end node for VC2. If the affected network device is a head-end node or a mid-point node (P1 for VC1), then the increased and expensive may be handled during a next re-optimization cycle. In other words, in response to the network device being a head-end device for a TE virtual circuit, and in response to an interface based critical fault condition, the network device may reoptimize the virtual circuit to avoid the one or more particular faulty network interfaces. Alternatively, if the device is a tail-end node, then the effect of increasing the metric may not help to divert the traffic off the tunnel if the tail-end loop back has no redundant tail. Thus, the tail-end node may be configured to signal to a head-end node to bring down the virtual circuit (e.g., tunnel), such as P1 telling PE4 to bring down VC2. This may be accomplished using Path-Err messages (e.g., with a "Fatal" bit set) of the Resource Reservation Protocol (RSVP), as opposed to waiting for a reoptimization timer, so that virtual circuit resources may be released and traffic diverted through a backup tunnel on the head-end node. Also, as noted above, OSPF has provided an option (knob) to include stubs in the expensive (e.g., max) metric, and thus when a tail-end node of a virtual circuit activates the new metric on detection of a fault, it could prevent traffic being forwarded towards that loopback, thus for tail-end nodes, the traffic can be diverted to an alternative path. Since IS-IS does not natively have an equivalent option, a novel "route invalidation" option is created herein to provide this functionality.

Moreover, another consideration is to interconnect with IP fast reroute (FRR) features, and force an FRR trigger on the detecting network device. Also, with the proposed BFD extensions, the additional signaling latency is generally very small, so, the peer end could also detect and trigger a high-priority recovery mechanism (e.g., IP-FRR) as well. Additionally, TE-FRR may also be used for interface (per-link) faults, to trigger fast divergence of traffic on the backup links.

Finally, if the network device contains a plurality of virtual network devices 249, then in response to a network device based critical fault condition, each virtual network device may be informed of the critical fault condition through signaling. That is, on certain routers, where virtual network devices (e.g., secure domain routers, or "SDRs") are supported, such that one physical device is logically partitioned into a number of virtual devices, then any device-wide faults may be propagated to the routing protocols in all virtual devices (all logical partitions). Note that critical faults specific to an interface may be acted upon within that specific virtual network device, accordingly.

Figure 6:
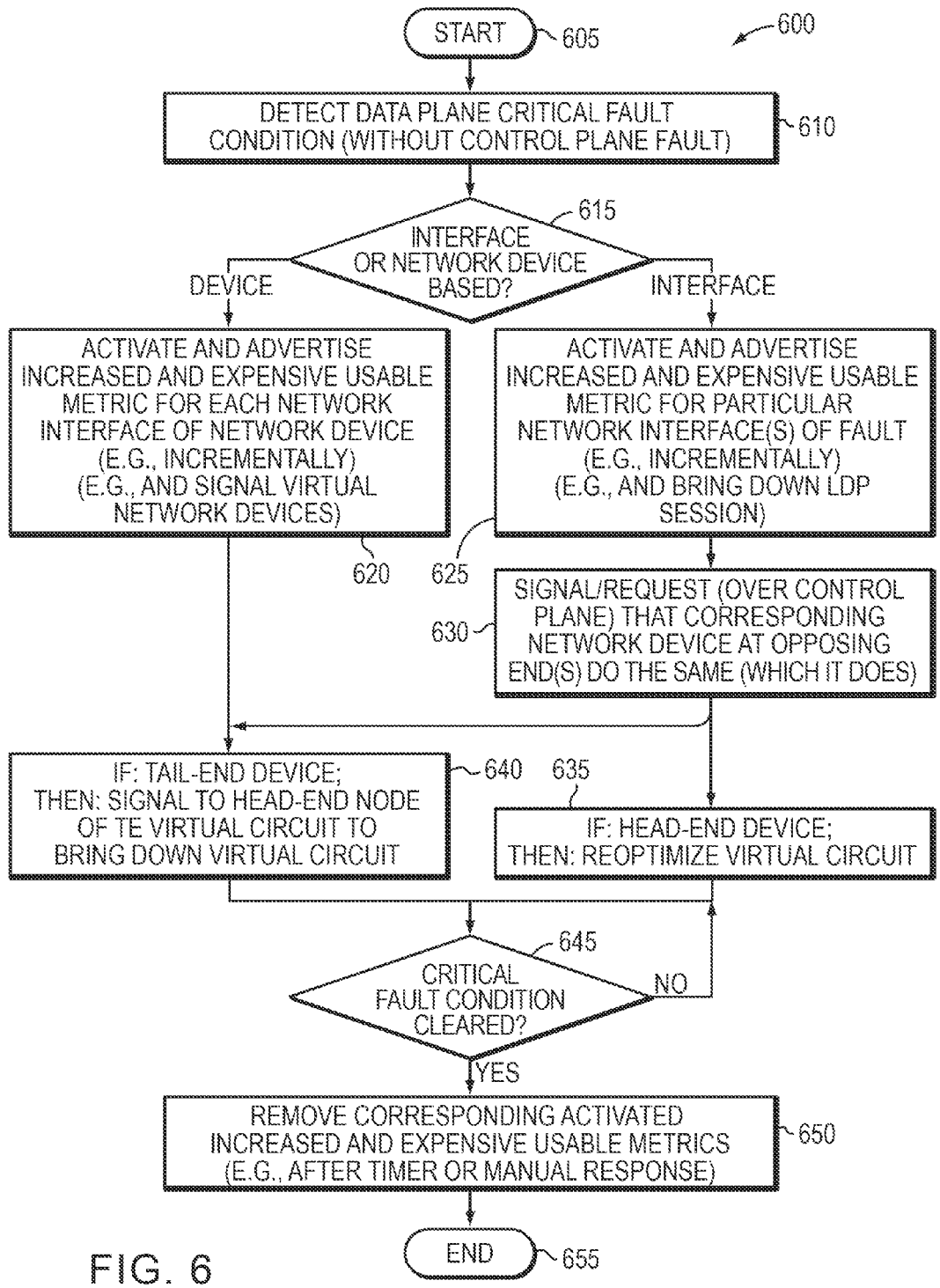
FIG. 6 illustrates an example procedure for gracefully handling critical traffic blackholing data plane faults.

FIG. 6 illustrates an example simplified procedure for gracefully handling critical traffic blackholing data plane faults in accordance with one or more embodiments described herein. The procedure 600 starts at step 605, and continues to step 610, where a network device 200 (e.g., P1) detects a data plane critical fault condition (without control plane fault) as described in detail above. If it is determined in step 615 that the fault is a network device based fault, then in step 620 the device may activate and advertise an increased and expensive usable metric for each network interface of network device. For instance, as noted above, the increase may be incremental (e.g., to avoid microloops). Also, if there are virtual devices 249, then those devices may be signaled (informed) of the fault condition to act accordingly, as well.

If, in step 615, it is determined that the fault is an interface based fault, then in step 625 the network device may activate and advertise (e.g., incrementally) an increased and expensive usable metric for each particular network interface of the detected fault. In addition, in step 630, the network device may send a signal or request over the still functioning control plane to a corresponding network device at opposing ends of the faulty network interfaces to indicate that the corresponding network device(s) do the same. Notably, in step 630, it is implied that the corresponding network device receives the request, and performs the requested operation, accordingly.

As described above, if (for an interface based fault) the network device is a head-end device for a TE virtual circuit, then in step 635 the device may reoptimize the virtual circuit to avoid the faulty interface(s). Also, in step 640, if (for either type of fault) the network device is a tail-end device for a TE virtual circuit, then the device may signal to a corresponding head-end node/device to bring down the virtual circuit. The head-end node in step 640 may then, if so configured, create a new virtual circuit, most likely avoiding the faulty (e.g., now high cost) interfaces.

Once the critical fault condition is cleared in step 645, then in step 650 the network device may remove the corresponding activated increased and expensive usable metrics from the affected network interfaces (e.g., the faulty ones or all of them). Note that as mentioned above, the removal in step 650 may occur after a timer or after a manual response to remove the metrics. The procedure 600 may then end in step 655.

The novel techniques described herein gracefully handle critical traffic blackholing data plane faults in a computer network. By allowing network devices to signal blackholing faults to the rest of the network, the novel techniques allow other network devices to route around the problem in question avoiding microloops, thus increasing the network's overall availability (e.g., useful for self-healing networks). In particular, the techniques described above allow customers to leverage redundancy in their network during such traffic blackholing data plane critical faults. For instance, traffic is handled gracefully without causing traffic drops (critical for video/mission critical applications), and microloops are prevented during the diversion of customer traffic. In addition, the techniques above allow customers to gracefully "cost-out" a single link under an out of service (OOS) maintenance window, which keeps the control-plane activate ("up") but diverts the data-plane traffic.

While there have been shown and described illustrative embodiments that gracefully handle critical data plane faults in a computer network, it is to be understood that various other adaptations and modifications may be made within the spirit and scope of the embodiments herein. For example, the embodiments have been shown and described herein using specific signaling and advertising protocols (e.g., BFD and IGP). However, the embodiments in their broader sense are not so limited, and may, in fact, be used with other suitable signaling/advertising protocols. Also, while the above description is shown primarily with regard to physical data plane functionality and related faults, other critical "virtual data plane" faults may also utilize the techniques herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

We claim:

1. A computer-implemented method comprising:
    detecting, in a network device having one or more network interfaces, a data plane critical fault condition associated with a data plane, wherein a corresponding control plane to the data plane is not experiencing a critical fault condition;
    activating, in response to detecting the data plane critical fault condition, an expensive usable metric for at least one network interface of the one or more network interfaces of the network device, and
    bringing down a Label Distribution Protocol (LDP) session on the at least one network interface having activated the expensive usable metric,
    wherein the at least one network interface of the network device experiencing the critical fault condition continues to be available for use with the expensive usable metric.

2. The computer-implemented method of claim 1, further comprising:
    determining that the data plane critical fault condition is associated with the network device, wherein activating the expensive usable metric for the at least one network interface includes activating the expensive usable metric for each of the one or more network interfaces of the network device.

3. The computer-implemented method of claim 1, further comprising:
    determining that the data plane critical fault condition is associated with the at least one network interface; and
    sending, over the control plane to a corresponding network device at an opposing end of each of the at least one network interface, a request to activate a corresponding expensive usable metric at the opposing end of each of the at least one network interface, wherein the expensive usable metric is only activated for the at least one network interface experiencing the data plane critical fault condition.

4. The computer-implemented method of claim 3, wherein sending the request comprises utilizing one of either Interior Gateway Protocol (IGP) messages or bidirectional forwarding detection (BFD) messages.

5. The computer-implemented method of claim 1, wherein the data plane critical fault condition includes at least one of multiple fabric planes of the network device being down, backplane bandwidth reduction, out of resources (OOR) conditions, or surpassing queue utilization thresholds.

6. The computer-implemented method of claim 1, further comprising:
    determining that the data plane critical fault condition has cleared; and
    removing the activated expensive usable metrics.

7. The computer-implemented method of claim 1, wherein the expensive usable metric is an Open Shortest Path First (OSPF) maximum metric.

8. A computing device, comprising:
    at least one processor;
    memory including instructions that, when executed by the processor, cause the computing device to:
        detect, in a network device having one or more network interfaces, a data plane critical fault condition associated with a data plane, wherein a corresponding control plane to the data plane is not experiencing a critical fault condition;
        activate, in response to detecting the data plane critical fault condition, an expensive usable metric for at least one network interface of the one or more network interfaces of the network device, and
        bring down a Label Distribution Protocol (LDP) session on the at least one network interface having activated the expensive usable metric,
    wherein the at least one network interface of the network device experiencing the critical fault condition continues to be available for use with the expensive usable metric.

9. The computing device of claim 8, wherein the instructions, when executed by the processor, further enable the computing device to:
    determine that the data plane critical fault condition is associated with the at least one network interface; and
    send, over the control plane to a corresponding network device at an opposing end of each of the at least one network interface, a request to activate a corresponding expensive usable metric at the opposing end of each of the at least one network interface, wherein the expensive usable metric is only activated for the at least one network interface experiencing the data plane critical fault condition.

10. The computing device of claim 9, wherein the instructions, when executed by the processor, further enable the computing device to:
    determine that the network device is a head-end device for a traffic engineering (TE) virtual circuit or a tail-end device for a TE virtual circuit;
    reoptimize the virtual circuit to avoid the at least one network interface in response to the data plane critical fault condition being associated with the at least one network interface; and
    signal to a head-end node of the TE virtual circuit to bring down the virtual circuit in response to the network device being a tail-end device for a TE virtual circuit.

11. The computing device of claim 8, wherein the instructions, when executed by the processor, further enable the computing device to:
    determine that the data plane critical fault condition is associated with the network device, wherein activating the expensive usable metric for the at least one network interface includes activating the expensive usable metric for each of the one or more network interfaces of the network device.

12. The computing device of claim 11, wherein the network device contains a plurality of virtual network devices, and wherein the instructions that, when executed by the at least one processor, further cause the computing device to:
   signal the critical fault condition to each virtual network device in response to the data plane critical fault condition being associated with the network device.

13. The computing device of claim 8, wherein the expensive usable metric is at least one of an Open Shortest Path First (OSPF) global maximum metric or an Intermediate-System-to-Intermediate-System (IS-IS) maximum metric value less two.

14. The computing device of claim 8, wherein the data plane critical fault condition includes at least one of multiple fabric planes of the network device being down, backplane bandwidth reduction, out of resources (OOR) conditions, or surpassing queue utilization thresholds.

15. A non-transitory computer-readable storage medium storing instructions that, when executed by at least one processor, cause a computing device to:
   detect, in a network device having one or more network interfaces, a data plane critical fault condition associated with a data plane, wherein a corresponding control plane to the data plane is not experiencing a critical fault condition;
   if the data plane critical fault condition is associated with the network device:
      activate an expensive usable metric for each of the one or more network interfaces of the network device; and
   if the data plane critical fault condition is associated with the at least one network interface:
      activate the expensive usable metric for the at least one network interface experiencing the data plane critical fault condition;
      send, over the control plane to a corresponding network device at an opposing end of each of the at least one network interface, a request to activate a corresponding expensive usable metric at the opposing end of each of the at least one network interface, and
      bring down a Label Distribution Protocol (LDP) session on the at least one network interface having activated the expensive usable metric,
   wherein each network interface of the network device experiencing the critical fault condition continues to be available for use with the increased and expensive usable metric.

16. The non-transitory computer-readable storage medium of claim 15, wherein the instructions that, when executed by the at least one processor, further cause the computing device to:
   determine that the network device is a head-end device for a traffic engineering (TE) virtual circuit or a tail-end device for a TE virtual circuit;
   reoptimize the virtual circuit to avoid the at least one network interface in response to the data plane critical fault condition being associated with the at least one network interface; and
   signal to a head-end node of the TE virtual circuit to bring down the virtual circuit in response to the network device being a tail-end device for a TE virtual circuit.

17. The non-transitory computer-readable storage medium of claim 15, wherein the network device contains a plurality of virtual network devices, and wherein the instructions that, when executed by the at least one processor, further cause the computing device to:
   signal the critical fault condition to each virtual network device in response to the data plane critical fault condition being associated with the network device.

18. The non-transitory computer-readable storage medium of claim 15, wherein the instructions that, when executed by the at least one processor, further cause the computing device to:
   determine that the data plane critical fault condition has cleared; and
   remove the activated expensive usable metrics.

19. The non-transitory computer-readable storage medium of claim 15, wherein the instructions that, when executed by the at least one processor, further cause the computing device to:
   remove the activated expensive usable metrics in response to at least one of an expiration of a timer or a manual response.

* * * * *